United States Patent [19]

Mitchell

[11] 4,339,791

[45] Jul. 13, 1982

[54] DC TO LOW FREQUENCY INVERTER WITH PULSE WIDTH MODULATED HIGH FREQUENCY LINK

[75] Inventor: Daniel M. Mitchell, Cedar Rapids, Iowa

[73] Assignee: Rockwell International Corporation, El Segundo, Calif.

[21] Appl. No.: 188,433

[22] Filed: Sep. 19, 1980

[51] Int. Cl.³ .......................................... H02M 7/537
[52] U.S. Cl. ...................................... 363/41; 363/134
[58] Field of Search .................. 363/2, 8, 26, 41, 98, 363/132–134

[56] References Cited

U.S. PATENT DOCUMENTS

| 3,423,663 | 1/1969 | Payne | 363/41 |
| 3,514,688 | 5/1970 | Martin | 363/132 |
| 3,636,430 | 1/1972 | Kernick et al. | 363/41 |
| 3,887,861 | 6/1975 | Anzai et al. | 363/98 |
| 4,244,015 | 1/1981 | Beebe | 363/41 X |

Primary Examiner—A. D. Pellinen
Attorney, Agent, or Firm—Richard K. Robinson; Harold R. Greenberg; H. Fredrick Hamann

[57] ABSTRACT

A variable duty cycle ultrasonic inverter is used to invert unregulated direct current into a high frequency variable pulse width modulated signal that is applied to a low frequency inverter by means of a high frequency transformer. The output of the low frequency is applied to an output filter where a feedback signal is coupled back to the variable duty cycle ultrasonic converter which is controlled by a comparison of the feedback signal and a sinusoidal reference signal. The sinusoidal reference signal is also used to control the low frequency inverter.

14 Claims, 9 Drawing Figures

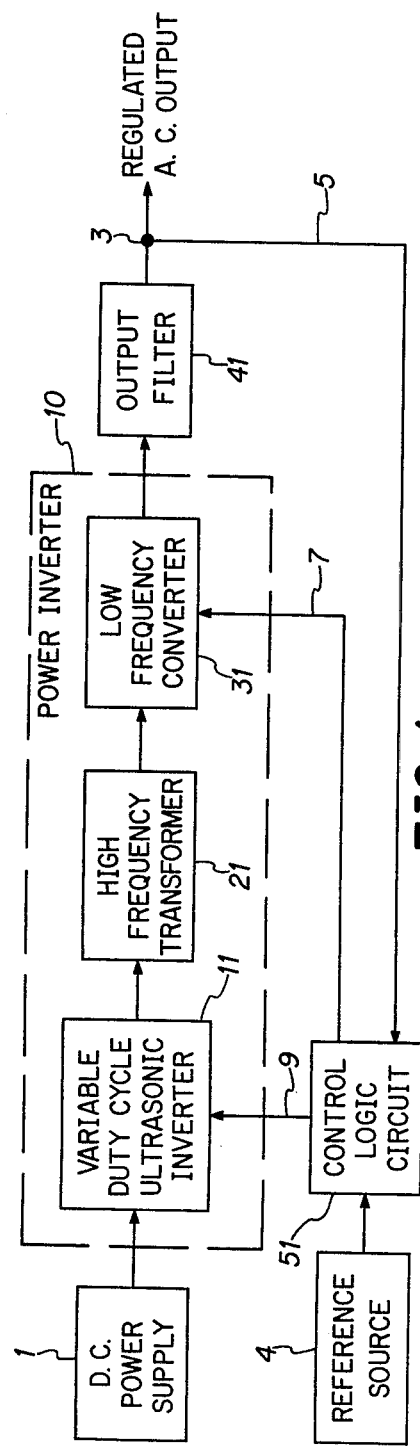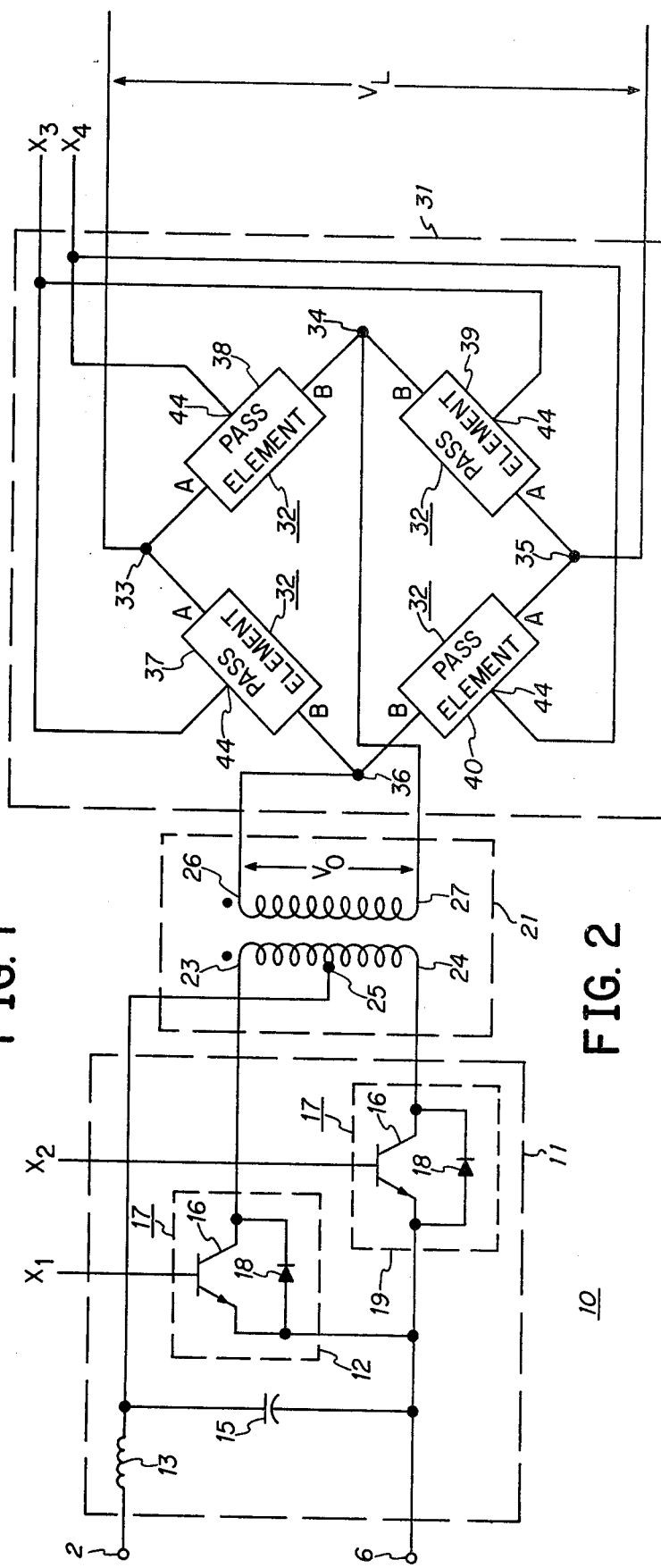
FIG. 1
FIG. 2

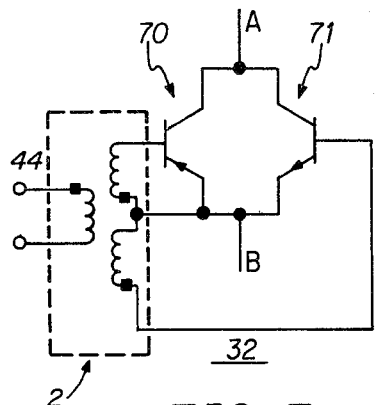
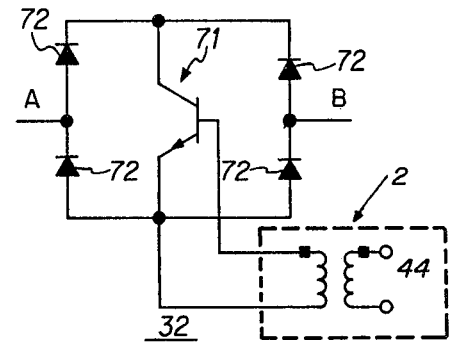
FIG. 3    FIG. 4
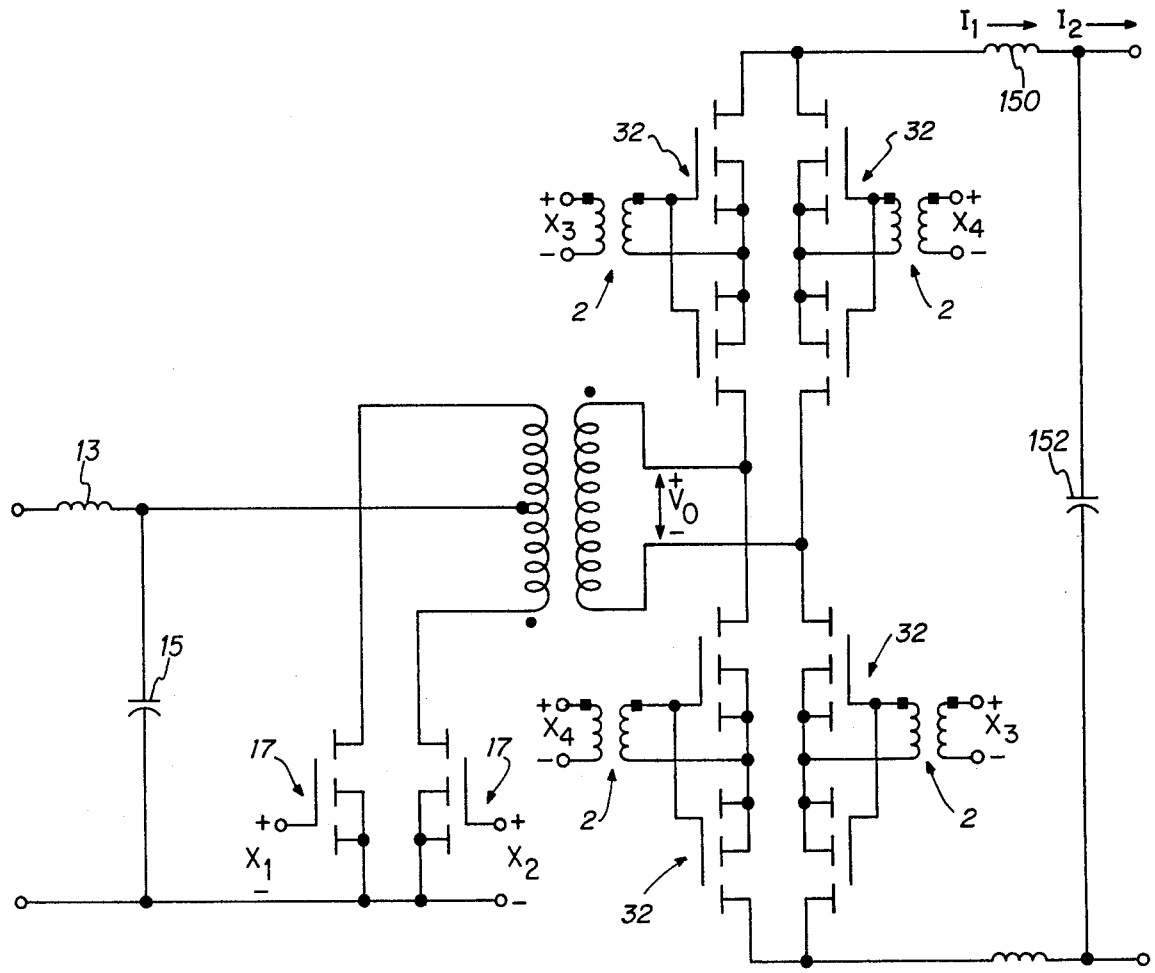
FIG. 5

FIG. 9

| | 136 | 133 | 137 | 131 | 138 | 134 | 139 | 144 | | | |
|---|---|---|---|---|---|---|---|---|---|---|---|
| 143 $\frac{di_L}{dt}$ | + | + | − | + | + | − | − | − | + | − | − | + |
| 142 $i_{39/40}$ | 0 | + | $+\frac{1}{2}$ | 0 | − | $-\frac{1}{2}$ | − | 0 | $-\frac{1}{2}$ | + | 0 | $+\frac{1}{2}$ |
| 141 $i_{37/38}$ | + | 0 | $+\frac{1}{2}$ | − | 0 | $-\frac{1}{2}$ | 0 | − | $-\frac{1}{2}$ | 0 | + | $+\frac{1}{2}$ |
| 140 $i_{19}$ | 0 | + | 0 | 0 | − | 0 | 0 | + | 0 | 0 | − | 0 |
| 135 $i_{12}$ | + | 0 | 0 | − | 0 | 0 | + | 0 | 0 | − | 0 | 0 |
| 132 $i_L$ | + | + | + | − | − | − | − | − | + | + | + | + |
| 130 $v_{OUT}$ | + | + | + | + | + | + | − | − | − | − | − | − |

DC TO LOW FREQUENCY INVERTER WITH PULSE WIDTH MODULATED HIGH FREQUENCY LINK

BACKGROUND OF THE INVENTION

This invention relates to direct current to alternating current, pulse width, modulated power converters.

Power conversion problems are encountered when it is necessary to utilize equipment designed for alternating current power in an environment where only direct current power is available or where a direct current primary power link is purposely employed to provide a battery backup in the event alternating current power becomes unavailable. In these applications a direct current to alternating current power converter is needed to interface the equipment to the primary power system. Virtually all modern alternating current equipment operate from either 115 or 230 volts AC±10% at either 50, 60, or 400 Hz±5%. In general, direct current primary power supplies are normally within the 11 to 32 volts DC range. This includes, for example, most modern aircraft and vehicular equipment.

In the prior art, the simplest approach to power conversion is to use a 60/400 Hz inverter followed by a low frequency transformer and filter. Regulation is achieved by preceding the inverter with an ultrasonic switching regulator or alternatively achieved in the inverter itself by varying the duty cycle of the inverter. In the case of the latter approach, the output filter must accommodate the worst case harmonic content of the signal's waveform which usually occurs at maximum input voltage. In the case of the former approach, the burden on the output filter is reduced because the DC level to the inverter is held constant. However, the switching regulator adds to the cost and degrades the efficiency of the overall power converter. In either case, the output filter must provide significant attenuation at the fundamental output frequency in order to provide a sinusoidal waveform.

The next level of sophistication of power converter design, in the prior art, is not only to vary the duty cycle of the inverter, but to chop the inverter's output signal into pulses with variable pulse widths by means of ultrasonic switching by using either feedback control against a sinusoidal reference or by "opening loop programming" of the control to distribute the width of the pulses. The burden on the output filter is, thus, reduced. Sinusoidally distributing the ultrasonic carrier frequency pulses that are used to control the ultrasonic switching allows the reduction in the size of the output filter and improves closed loop response. These improvements are a result of the higher break point in the frequency response of the output filter and the higher sample data rate of the inverter. However, this approach still requires a large low frequency power transformer. Especially in the application of 50 to 60 Hz AC power, the size of the transformer completely dominated the size and weight of the power converter.

SUMMARY OF THE INVENTION

A variable duty cycle ultrasonic inverter is used to invert unregulated DC power into a high frequency variable pulse width modulated signal that is applied to a low frequency converter by means of a high frequency transformer. The output of the low frequency converter is applied to an output filter where a feedback signal is coupled back to the variable duty cycle ultrasonic inverter which is controlled by a comparison of the feedback signal and a sinusoidal reference signal. The sinusoidal reference signal is also used to control the low frequency converter.

The variable duty cycle ultrasonic inverter performs all of the regulation and harmonic neutralization functions. The low frequency converter steers the high frequency pulses into the load either positively or negatively. Both the variable duty cycle of the ultrasonic inverter and the low frequency converter have reverse current paths so that reactive load currents can be fed back into the direct current power bus. The control of the variable duty cycle ultrasonic inverter and the low frequency converter is generated by the comparison of a full-wave rectified reference signal with a full-wave rectified-feedback signal with the difference being an error signal. The error signal is compared to a sawtooth waveform whereby a logic one state is provided each time the sawtooth waveform is less than or equal to the error signal and a logic zero state is provided each time the sawtooth waveform is greater than the error signal.

The binary output from the comparators are gated with a local clock signal to provide the control signal for the variable duty cycle ultrasonic inverter. The control signals for the ultrasonic inverter are gated with the logic output from a zero cross detector circuit that detects each time the alternating sine wave reference signal crosses zero to provide the control signal for the low frequency inverter. There are several embodiments of both the high frequency variable duty cycle ultrasonic inverter as well as the low frequency converter provided.

Many advantages of the present invention may be ascertained from a reading of the specification and claims in conjunction with the drawings.

BRIEF DESCRIPTION OF THE DRAWINGS

FIG. 1 is a block diagram of a direct current to alternating current converter according to the teachings of the invention;

FIG. 2 is a schematic diagram of the power inverter assembly of FIG. 1;

FIG. 3 is a schematic diagram of the pass elements used in the low frequency converter of FIG. 2;

FIG. 4 is a second embodiment of the pass elements used in the low frequency converter of FIG. 2;

FIG. 5 is a second embodiment of the power inverter according to the invention;

FIG. 9 is a state diagram of the circuitry of FIG. 2 or 5.

DETAILED DESCRIPTION OF THE PREFERRED EMBODIMENT

Figure 6:
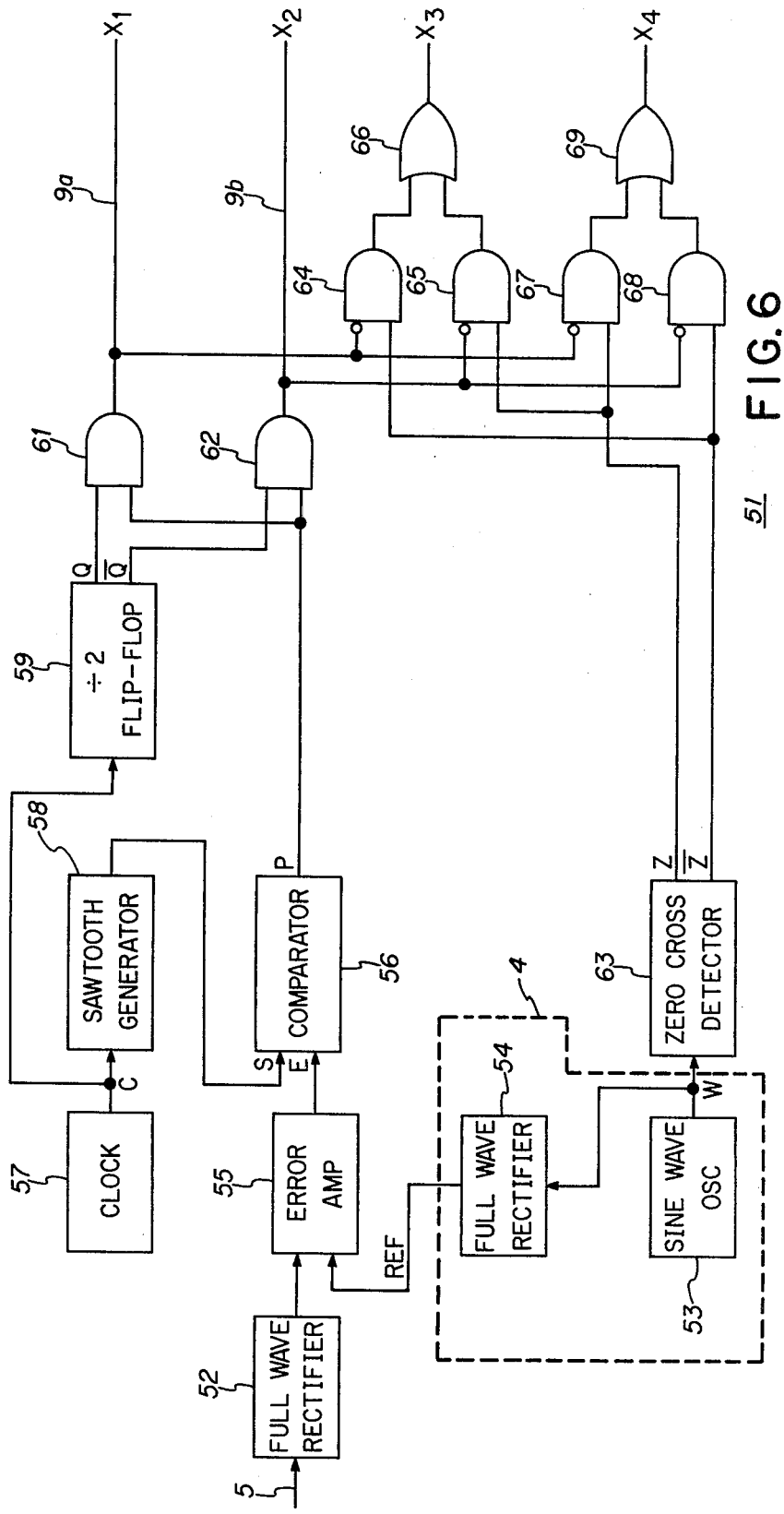
FIG. 6 is a logic diagram of the control logic circuit according to FIG. 1.

In FIG. 1, to which reference should now be made, there is illustrated a block diagram of the direct current to alternating current pulse width modulated power converter, according to the invention. A DC power supply 1 provides power to a power inverter 10 whose output is filtered by an output filter 41 to obtain a regulated alternating current output at node point 3. The power inverter 10 includes a variable duty cycle ultrasonic inverter 11 whose output is applied to a high frequency transformer 21 for coupling to the low frequency converter 31. The high frequency transformer 21 provides isolation between the DC power supply and the load. The high frequency signal, which is generally 20 times the fundamental output frequency and preferably because of audio noise problems should be in ultrasonic range of 20 KHz or greater, is applied to the low frequency converter 31 which steers the high frequency pulses, either positive pulses or negative pulses, into the load that includes the output filter 41 as well as any parallel load connected to node point 3.

The variable duty cycle ultrasonic inverter 11 is controlled by control signals on conductor bundle 9 that are provided by a control logic circuit 51 which monitors the regulated alternating current output signal at node point 3 by means of conductor 5 and compares the regulated alternating current output signal to a reference signal that is provided by a reference source 4. In addition, the control logic circuit 51 provides the steering commands to the low frequency converter 31 via conductor 7.

A schematic diagram of the power inverter 10 is provided in FIG. 2 in which the variable duty cycle inverter 11 includes a high frequency input filter that consists of an inductor 13 and capacitor 15. The positive DC terminal is connected to the center tap of the high frequency transformer 21 while the negative terminal is connected to two pass elements 17. A first pass element 12 is connected to a terminal 23 of high frequency transformer 21 and a second pass element 19 is connected to terminal 25 of high frequency transformer 21. Each pass element 17 has included therein a diode 18 and a NPN transistor 16.

The first pass element 12 is controlled by a control signal $X_1$ which is applied to the base of transistor 16. When the voltage level of $X_1$ is greater than the emitter potential of transistor 16, the voltage level present at terminal 6 is conducted to terminal 24 of the high frequency transformer 21 via the transistor 16 of the second pass element 19. Diodes 18 of both pass elements 17 provide a reverse current path so that reactive load currents can be fed back to the DC bus that is connected to terminal 6 from the high frequency transformer 21 and the reactive load. Control signals $X_1$ and $X_2$ alternate so that the signal across terminals 2 and 6 is alternately present across terminals 25 and 23 and terminals 25 and 24. This causes a secondary voltage $V_0$ to be induced across the secondary winding of high frequency transformer 21.

Terminals 26 and 27 (the secondary winding of the high frequency transformer 21) are connected across a bridge network that comprises the low frequency converter 31. The bridge network is made from four pass elements 32 arranged in a bridge configuration that includes positions 37, 38, 39 and 40. Each pass element has an A and B terminal with the pass elements in positions 37 and 38 having their A terminals joined together at node point 33; and the A terminals of the pass elements 32 in positions 39 and 40 are joined together at node point 35. Node points 33 and 35 create the output terminals of the low frequency converter 31 while node points 36 and 34 are the input terminals and are joined to terminals 26 and 27 of the high frequency transformer 21. Node point 36 is the point where the B terminals of the pass elements 32 in positions 37 and 40 are joined together and node point 34 is where the B terminals of pass elements 32 in positions 38 and 39 are joined together. Steering command signal $X_3$ is connected to the control terminal 44 of the pass elements in positions 38 and 40 while steering command $X_4$ is connected to the control terminal 44 of the pass elements that are in positions 37 and 39. The pass elements essentially transfer alternately terminal 26 and terminal 27 to node joints 33 and 35 so that the signal $V_0$ that is across the secondary winding will be coupled alternately across the node points 33 and 35 of the low frequency converter 31.

FIG. 3 is a schematic diagram of one embodiment of the pass element 32 and includes a PNP transistor 70 and an NPN transistor 71. The A terminal of each pass element 32 is connected to the emitters of the transistors 70 and 71 and the B terminal is connected to the collectors of the transistors 70 and 71 with the input terminal being an isolation transformer 2 connected to the base of the two transistors. The variable duty cycle ultrasonic inverter will turn on into a short circuit if either transistor 70 or 71 in positions 37 and 38 or 39 and 40 are on. Therefore, the transistors in positions 37 and 38, and 39 and 40 are interlocked with the turn-off of the transistors 16 of the pass elements 17 of the variable duty cycle ultrasonic inverter 11 by the control logic circuit 51.

The variable duty cycle ultrasonic inverter 11 is pulse width modulated according to the instantaneous error between the sinusoidal reference voltage and the regulated AC output signal. The low frequency converter 31 steers the pulses either in a positive output or a negative output direction depending on the polarity of the reference signal that is provided by reference source 4 of FIG. 1. Whether transistor 70 or 71 is turned on depends upon the polarity of the load current. This is accomplished without the need of a load current polarity sensor since the load current can only flow through one or the other of the transistors 70 or 71, even if an attempt is made to turn on both transistors simultaneously. The steering commands $X_3$ or $X_4$ are applied to the pass elements via isolation transformer 2.

Depending upon the application, it may be more desirable to replace the transistor pair 70 and 71 with a single transistor and a diode bridge. This embodiment is provided in FIG. 4 and is generally preferred over the embodiment of FIG. 3 because of the increased blocking voltage capacity.

FIG. 5 is the preferred embodiment of the power inverter 10 as well as the output filter 41. The output filter 41 consists of an inductor 150 and a capacitor 152. The load is connected across the capacitor 152. Pass elements 17 and 32 are power MOSFETS. The power MOSFETS are well suited for power applications in the steering circuit because of their inherent bidirectional current flow and thus current switching capabilities.

The control logic circuit 51 of FIG. 1 is provided in FIG. 6 to which reference should now be made. The regulated AC output signal is applied to a full-wave rectifier 52 where a rectified output analog signal is obtained and applied to the error amplifier 55. Simultaneously, a sine wave oscillator provides a sinusoidal signal at node point W and to a full-wave rectifier 54 the output of which is a rectified sine wave analog that is applied to the error amplifier 55. The error amplifier 55 which in most cases is a difference amplifier compares the two rectified analog signals and obtains an error signal that is applied to the E terminal of comparator 56. The comparator 56 compares a sawtooth waveform at terminal S that is provided by the sawtooth generator 58 which is driven by a clock 57. The comparator 56 provides a binary signal on terminal P that is a first logic state when the amplitude of the sawtooth signal that is present on terminal S is less than or equal to the amplitude of the error signal that is present on terminal E and a second logic state when the amplitude of the signal on terminal S is greater than the error signal that is present on terminal E. A more detailed description of the circuitry used in the comparison of a rectified reference signal with a rectified output signal to obtain an error signal and then the comparison of the error signal with a sawtooth waveform is provided in my U.S. Pat. No. 4,244,016. The output from the clock 57 is also applied to a flip-flop 59 which of course is a divide by two counter. The Q terminal of the flip-flop 59 is combined with the logic signal that is present at terminal P of comparator 56 by the AND gate 61 to provide the $X_1$ signal on conductor 9a while the $X_2$ signal is present on conductor 9b and is the result of the comparison of the signal that is present on the $\overline{Q}$ terminal of flip-flop 59 with the logic signal that is present on the P terminal of the comparator 56.

The steering commands are generated by the combining of the control signals $X_1$ and $X_2$ with a polarity signal. The polarity signal is generated by the zero cross detector 63 which detects each time the signal from the sine wave oscillator 53 is at a zero level. The output of the zero cross detector 63 is a logic signal that is present on terminal Z and the complement of the signal present on terminal Z is of course present on terminal $\overline{Z}$. Steering commmand $X_3$ is obtained by ORing the outputs of AND gates 64 and 65 by the OR gate 66. The AND gate 64 ANDS the complement of the $X_1$ signal with the signal that is present on the $\overline{Z}$ terminal of the zero cross detector 63 whereas AND gate 65 ANDS the complement of the $X_2$ signal with the signal that is present on the Z terminal of the zero cross detector 63. Steering command signal $X_4$ is provided by ORing the outputs of the AND gate 67 with the output of the AND gate 68 by OR gate 69. AND gate 67 ANDS the complements of the $X_1$ signal with the signal that is present on the Z terminal of the zero cross detector 63 and AND gate 68 ANDS the complement of the $X_2$ signal with the signal that is present upon the $\overline{Z}$ terminal of the zero cross detector 63.

Figure 7:
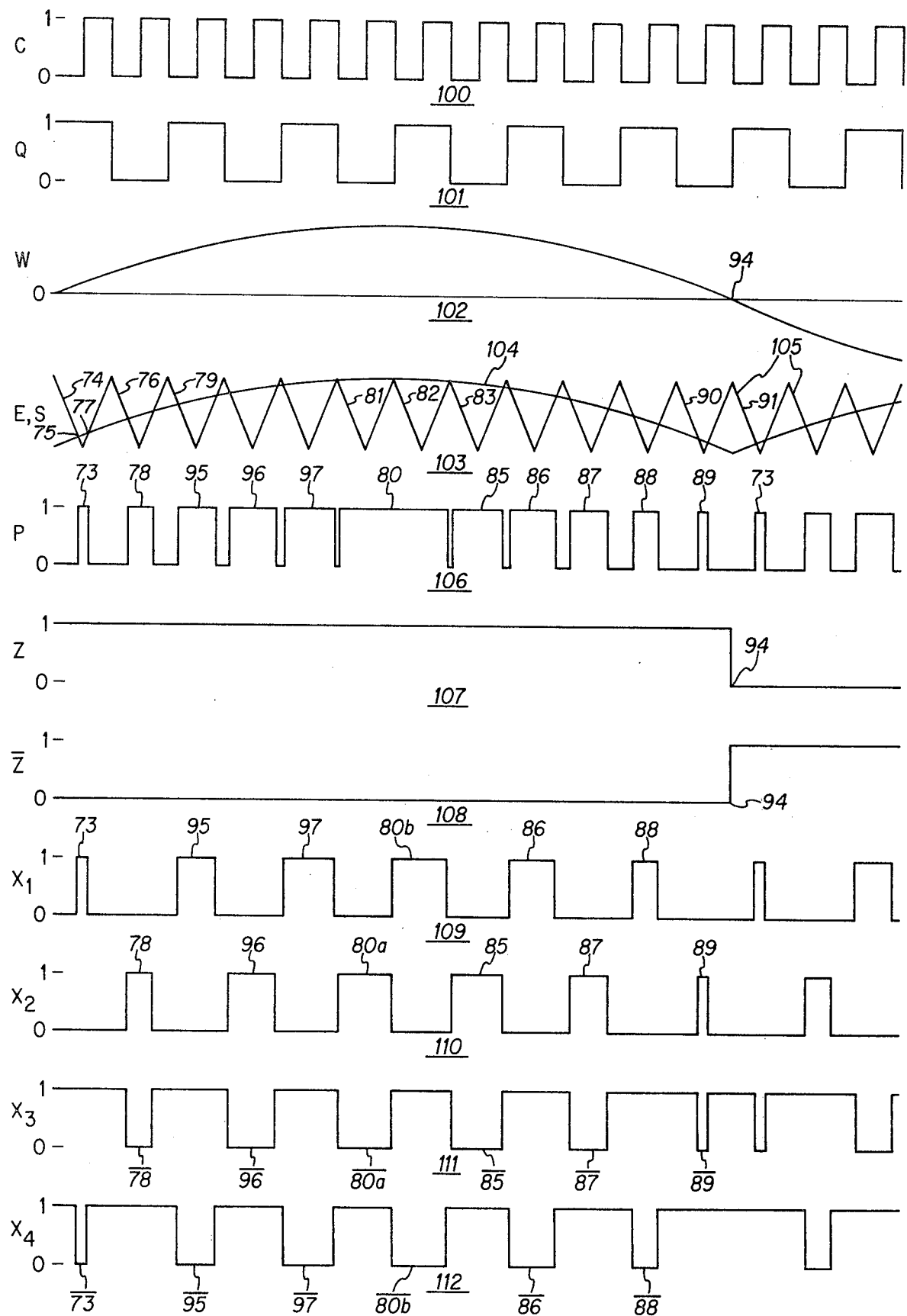
FIG. 7 is a timing diagram of the invention according to FIG. 2 or 5.

In FIG. 7, which is a timing diagram of the control logic circuit of FIG. 6 and should be used in conjunction with FIG. 6; the clock 57 provides a string of clock pulses on terminal C that is represented by waveform 100. The clock pulses in the preferred embodiment are 50% duty cycle pulses and the frequency is chosen to assure sufficient ripple rejection of the "carrier frequency" or clock frequency by the circuit which includes the output filter 41 and is normally approximately twenty times the desired output frequency. Waveform 101 is a square wave waveform that is one-half the frequency of the clock pulses at node point C and represented by waveform 100 and is the waveform that is present on terminal Q of the flip-flop 59 in FIG. 6. The output of the sine wave oscillator 56 that is present at terminal W is represented by waveform 102. Waveform 103 shows the comparison of the two signals that are presented on the E and S terminals of the comparator 56. The rectified sinusoidal waveform 104 is of course the output of the error amplifier 55, whereas, sawtooth waveform 105 is the output of the sawtooth generator 58 of FIG. 6. Waveform 106 is the waveform that is present on terminal P of comparator 56 and results from the comparison of the signals that are present on the E and S terminals of the comparator 56 as illustrated in waveform 103. The rising edge of pulse 73 occurs when sawtooth 74 drops to and below the amplitude of waveform 104 generally at point 75 and the falling edge of pulse 73 occurs when the rising edge of sawtooth 76 crosses the waveform 104 at point 77. As waveform 104's amplitude increases, the width of the pulses associated with waveform 106 increases. For example, pulse 78's width is larger than pulse 73 and its rising edge occurs when the falling edge of sawtooth 76 reaches the level of waveform 104 and its falling edge occurs when the rising edge of sawtooth 79 crosses the waveform 104. This process continues until the maximum pulse width occurs at pulse 80. Pulse 80's rising edge occurs when the sawtooth 81's falling edge drops below waveform 104 and because waveform 104 is equal to or greater than sawtooth 82 the falling edge of pulse 80 occurs when sawtooth 83's rising edge again crosses the waveform 104, at which time the falling edge of pulse 80 occurs. The subsequent pulses 85, 86, 87, and 88 each are narrower than the preceding pulse with the narrowest pulse occurring at pulse 89. The rising edge of pulse 89 coincides with the falling edge of sawtooth 90 and its falling edge coincides with the rising edge of sawtooth 91 at which case depending upon the level of the error signal that is represented by waveform 104 the process repeats itself beginning with pulse 73.

Waveform 107 is the output of the zero cross detector 63 which is positive, as long as the signal present on the W terminal of the sine wave oscillator 53 is greater than a zero level. Reference should be made to waveform 102 at point 94 where the waveform 102 crosses the zero line. At this point, the Z level returns to a zero state and the signal represented by waveform 108 that is present on the $\overline{Z}$ terminal of the zero cross detector 63 goes from the logic zero state to the logic 1 state. As was discussed in conjunction with FIG. 6, the control signal $X_1$ that is present on conductor 9a results from the combining of the signal that is present on terminal Q of the flip-flop 59 and is represented by waveform 101 and the signal that is present on terminal P of comparator 56 and is represented by waveform 109. Pulse 73 of waveform 106 occurs during the time terminal Q is at a logic 1 state as represented by waveform 101 so the AND gate 61 essentially passes a signal through that has the pulse width of pulse 73. This is illustrated in waveform 109 for the control signal $X_1$ and the waveform 110 for the control signal $X_2$. The pulses represented by waveform 106 are also identified by their numbers in waveforms 109 and 110. Pulse 78 occurs in waveform 110 for the control signal $X_2$. During the pulse 80 there is a state change of the Q and $\overline{Q}$ terminals of flip-flop 59 which causes the pulse 80 to be divided into two pulses. Pulse 80a is the $X_2$ control signal and pulse 80b is the $X_1$ control signal.

Waveforms 111 and 112 represent the steering command signals $X_3$ and $X_4$. The complement of pulse 78 occurs in the $X_3$ signal waveform 111 at point $\overline{78}$ and similarly the complement of pulse 73 occurs in the $X_4$ signal waveform 112 at point $\overline{73}$. The other pulses are identified by the complement at the locations in which they occur during the period of time illustrated by waveforms 111 and 112.

Figure 8:
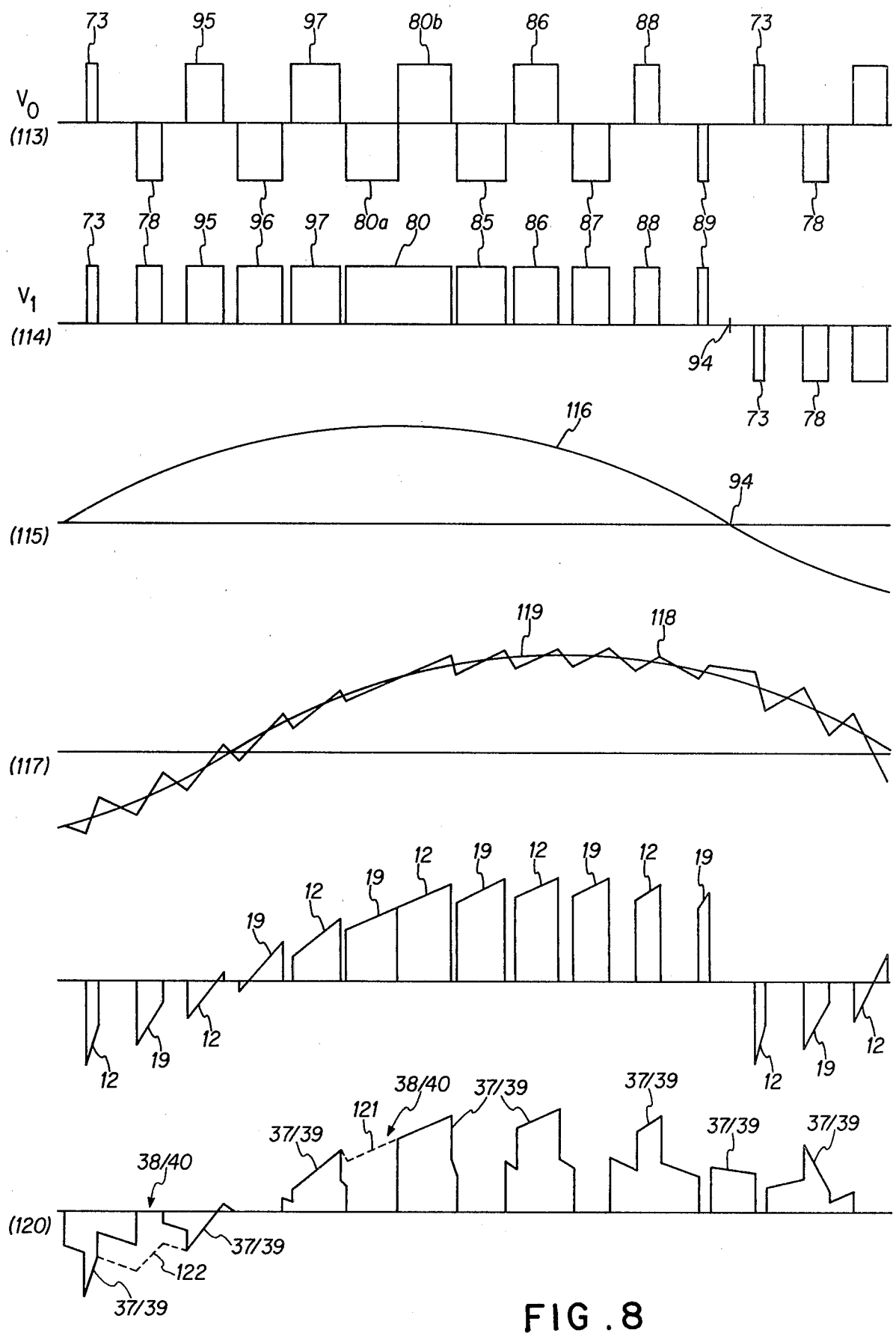
FIG. 8 is a timing diagram that is a continuation of the timing diagram of the circuitry of FIG. 7.

Waveform 113 of FIG. 8, which is a continuation of FIG. 7, represents the signal $V_0$ that is across the secondary winding of the transformer 21 of FIG. 1. The pulses 73, 78, 95, 96, 97, 80, 85, 86, 87, 88 and 89 are identified.

Waveform 114 represents the voltage V₁ that is present across node points 33 and 35 of the low frequency converter 31. Again, the pulses of waveform 106 are identified by their peaks and after the occurrence of pulse 89 at point 15 there is a zero level crossing and the negative pulses 73, 78, 95, 96, 97, 98, 80, 85, 86, 87, 88 and 89 occur. Waveform 115 is the output voltage of the output filter 41 and illustrates a sinusoidal waveform 116 with a zero point crossing at point 94. The current I₁ as shown in FIG. 5 that flows through the inductor 150 and the current I₂ that flows through the load are illustrated by waveform 117 with I₁ being represented by waveform 118 and the current flowing through the load I₂ being represented by waveform 119. The current flowing through the pass elements 12 and 19 is illustrated by waveform 123 with the numbers 12 and 19 shown inside the pulses for the period of time that the pass elements 12 and 19 are on. Waveform 123 also illustrate that pass elements 12 and 19 are alternately on and off and are never on at the same time.

Waveform 120 is a timing diagram which illustrates the period of time that pass elements in positions 37 through 40 are on. For simplification, the turn on of pass elements in positions 38 and 40 are shown only twice: once during time period 121 and once in time period 122. The operation of the low frequency converter 31 can be ascertained from waveform 120 with pass elements in positions 37 and 39 being on, as illustrated, and the pass elements in positions 38 and 40 being on or conducting only during the time periods that the pass elements in positions 37 and 39 are off.

FIG. 9 is a state diagram of the DC to Frequency Inverter, according to the invention, with column 130 representing the positive states of the output voltage that is present at node point 3 of FIG. 1. It is obvious (given the fact that each horizontal line represents 30°) from comparison of the states that the output voltage is positive for one-half cycle and negative for one-half cycle beginning at horizontal line 131, the 180° line. Column 132 represents the current that flows through the load and lags the output voltage by one-quarter of a cycle. That is, the current changes from positive at horizontal line 133, the 90° line, and from negative at horizontal line 134, the 270° line. Column 135 is the state of the current flowing through pass element 12 and it changes from positive to zero at horizontal line 136, 30° line, and from zero to negative at horizontal line 133, 90° line, then back to zero at horizontal line 137, 120° line, and from zero to positive at horizontal line 131, 180°, at which point it repeats the cycle that is from positive to zero at horizontal line 138, 210° line, and then from zero to negative at horizontal line 134, 270° line, and at horizontal line 139, 300° line, from negative to zero.

The current flowing through pass element 19 is out of phase by 30° with the current flowing through pass element 12. When pass element 12 is conducting, pass element 19 is off and column 140 represents the state of pass element 19. Current flow through pass elements in positions 37 and 38 are represented by column 141 and pass elements 39 and 40 is shown in column 142. Prior to horizontal line 133 there is a $+\frac{1}{2}$ on state shown for pass elements in positions 37 and 38, and 40 and 41. This implies that the two pass elements are sharing positive current. Similarly, there is a $-\frac{1}{2}$ current shown prior to horizontal line 131 and 134. The state diagram of the ratio of the differential of the load current to time is illustrated in column 143.

Many changes and modifications in the above described embodiment of the invention can, of course, be carried out without departing from the scope thereof. Accordingly, to promote the progress in science and useful arts, the invention is disclosed and is intended to be limited only by the scope of the appended claims.

I claim:

1. A direct current to alternating current pulse width modulated power converter comprising:
   controllable inverter means for inverting a direct current signal into a high frequency alternating current signal at a rate and period determined by a first and second control signal;
   power steering means for steering the high frequency alternating current signal to its output terminal for a controllable period of time and at a power that is controlled by a third and fourth control signal and to provide an alternating current output signal;
   link means for linking the high frequency alternating current signal to the power steering means;
   reference generator means for generating an alternating current reference signal;
   control signal generator means for generating the first and second control signals from the reference signal and the alternating current output signal;
   zero cross detector means for detecting each time the alternating current reference signal is at a zero level and to provide a binary detect signal and the complement of the binary detect signal whereby the binary detect signal and the complement of the binary detect signal alternate logic states each time the alternating current reference signal is at a zero state;
   means for obtaining the complement of the first and second control signals;
   third gate means for providing the third control signal from the complement of the first control signal and the complement of the binary detect signal or the complement of the second control signal and the binary detect signal; and
   fourth gate means for providing the fourth control signal from the complement of the first control signal and with the binary detect or the complement of the second control signal and the complement of the binary detect signal.

2. The direct current to alternating current pulse width modulated power converter according to claim 1 further comprising;
   a low pass filter means for filtering the alternating current output.

3. A direct current to alternating current pulse width modulated power converter according to claim 1 or 2 wherein the control signal generator means comprises:
   comparator means for comparing the alternating current reference signal with the alternating current output signal and to provide an adjusting signal that results from the comparison of the alternating current reference signal with the alternating current output signal; and
   frequency control generator means for generating the first and second control signals from the adjusting signal.

4. The direct current to alternating current pulse width modulated power converter according to claim 3 wherein the comparator means comprises:

first rectifier means for rectifying the alternating current output signal;

second rectifier means for rectifying the alternating current reference signal; and difference amplifier means for obtaining the adjusting signal that is the difference between the rectified alternating current output signal and the rectified alternating current reference signal.

5. The direct current to alternating current pulse width modulated power converter according to claim 3 wherein the frequency control generator means comprises:

oscillator means for generating a comparison signal having a sawtooth waveform;

means for comparing the adjusting signal with the comparison signal to provide a compared signal that is a binary signal with a first state during the period of time that the comparison signal has an amplitude less than the adjusting signal and a second state when the comparison signal has an amplitude greater than the adjusting signal;

first gate means for gating the compared signal at a periodic rate whereby the first control signal is a binary signal that is the output of the first gate means; and second gate means for gating the compared signal at the complement of the periodic rate whereby the second control signal is a binary signal that is the output of the second gate means.

6. The direct current to alternating current pulse width modulation power converter according to claim 1 wherein the link means comprises a high frequency transformer for connecting the output of the controllable inverter means to the input of the power steering means.

7. The direct current to alternating current pulse width modulation power converter according to claim 1 wherein the power steering means comprises four gateable semiconductor devices arranged in a bridge configuration.

8. The direct current to alternating current pulse width modulation power converter according to claim 7 wherein each of the four gateable semiconductor devices comprises:

a PNP transistor;

a NPN transistor;

means for connecting the emitter of the NPN transistor to the emitter of the PNP transistor;

means for connecting the collector of the NPN transistor to the collector of the PNP transistor; and transformer means for connecting the third and fourth control signals to the base of the NPN transistor and to the base of the PNP transistor.

9. The direct current to alternating current pulse width modulation power converter according to claim 7 wherein each of the four gateable semiconductor devices comprises:

first and second diodes joined together at their cathode;

third and fourth diodes joined together at their anode;

NPN transistor;

means for connecting the cathodes of the first and second diodes to the collector of the NPN transistor;

means for connecting the anode of the third and fourth diodes to the emitter of the NPN transistor;

output terminal means for connecting the cathode of the third diode to the anode of the first diode and the cathode of the fourth diode to the anode of the second diode; and transformer means for connecting the third and fourth control signal to the base of the NPN transistor.

10. The direct current to alternating current pulse width modulation power converter according to claim 7 wherein each of the four gateable semi-conductor devices comprising:

a power MOSFET.

11. A method for converting a direct current signal to an alternating current signal comprising:

inverting a direct current signal into a high frequency alternating signal at a rate determined by a first and second control signal;

steering the high frequency alternating current signal to the output terminals of a power steering means for a controllable period of time at a power that is controlled by a third and fourth control signal to provide an alternating current output signal;

generating an alternating current reference signal;

generating the first and second control signals from the alternating current reference signal and the alternating current output signal; and detecting each time the alternating current reference signal is at zero level and to provide a binary detect signal and the complement of the binary detect signal whereby the binary detect signal and the complement of the binary detect signal alternate logic states each time the alternating current reference signal is at a zero state;

complementing the first and second control signal;

obtaining the third control signal from the combination of the complement of the first control signal and the complement of the binary detect signal or the complement of the second control signal and the binary detect signal; and obtaining the fourth control signal from combining the complement of the first control signal with the binary detect signal or the complement of the second control signal with the complement of the binary detect signal.

12. The method according to claim 11 wherein the step of generating the first and second control signals comprises:

comparing the alternating current reference signal with the alternating current output signal and to provide an adjusting signal that results from the comparison of the alternating current reference signal with the alternating current output signal; and generating the first and second control signals from the adjusting signal.

13. The method according to claim 12 wherein the step of generating the first and second control signals comprises:

rectifying the alternating current output signal;

rectifying the alternating current reference signal; and obtaining the adjusting signal that is the difference between the rectified alternating current output signal and the rectified alternating current reference signal.

14. The method according to claim 13 wherein the step of generating the first and second control signals from the adjusting signal comprises:

generating a comparison signal having a sawtooth waveform;

comparing the adjusting signal with the comparison signal to provide a compare signal that is a binary signal with a first state during the period of time that the comparison signal has an amplitude less than the adjusting signal and a second state when the comparison signal has an amplitude greater than the adjusting signal;

gating the compared signal at a periodic rate whereby the first control signal is a binary signal that results from the gating of the compared signal at the periodic rate and gating the compared signal at the complement of the periodic rate, whereby the second control signal is a binary signal that results from the gating of the compared signal at the complement of the periodic rate.

* * * * *